Figure 1:
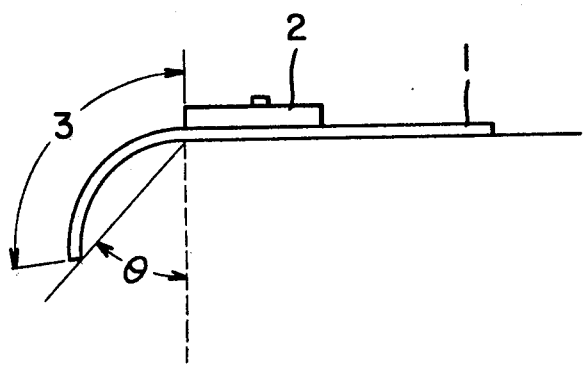

United States Patent [19]

Mitsuishi et al.

[11] 4,198,458
[45] Apr. 15, 1980

[54] LAMINATE POLYESTER FILMS

[75] Inventors: Yukio Mitsuishi, Machida; Shigeru Shiozaki; Hitoshi Murakami, both of Sagamihara, all of Japan

[73] Assignee: Teijin Limited, Osaka, Japan

[21] Appl. No.: 594,621

[22] Filed: Jul. 10, 1975

Related U.S. Application Data

[63] Continuation-in-part of Ser. No. 467,291, May 6, 1974, abandoned, and Ser. No. 478,325, Jun. 11, 1974, abandoned.

[30] Foreign Application Priority Data

| May 11, 1973 | [JP] | Japan | 48/51733 |
| Jun. 14, 1973 | [JP] | Japan | 48/66315 |
| Jun. 25, 1973 | [JP] | Japan | 48/70706 |
| Jul. 5, 1973 | [JP] | Japan | 48/75249 |
| Nov. 16, 1973 | [JP] | Japan | 48/128165 |
| Mar. 18, 1974 | [JP] | Japan | 49/30074 |
| Mar. 23, 1974 | [JP] | Japan | 49/32224 |

[51] Int. Cl.² .................. G11B 25/06; B32B 27/36
[52] U.S. Cl. ............................... 428/212; 274/11 E; 274/43; 428/323; 428/339; 428/409; 428/480; 428/900; 428/910
[58] Field of Search ............ 274/11 R, 11 E, 43; 428/212, 409, 480, 900, 323, 332, 339, 910

[56] References Cited

U.S. PATENT DOCUMENTS

| 2,804,401 | 8/1957 | Cousino | 428/900 |
| 3,416,991 | 12/1968 | Yoshimura | 428/123 |
| 3,515,626 | 6/1970 | Duffield | 428/325 |
| 3,900,653 | 8/1975 | Riboulet et al. | 428/409 X |
| 3,958,064 | 5/1976 | Brekkan et al. | 428/900 |
| 3,967,025 | 6/1976 | Tanabe et al. | 428/212 |
| 3,983,285 | 9/1976 | Riboulet et al. | 428/900 X |

Primary Examiner—Harold Ansher
Attorney, Agent, or Firm—Sherman & Shalloway

[57] ABSTRACT

A stretch-oriented laminate polyester film consisting of two or three layers of polyester films; both polyester film A and polyester film B which form the external layers of the laminate film are composed of a polyester having an intrinsic viscosity of 0.35 to 1.0, wherein the intrinsic viscosity of a polyester forming the polyester film B is 0.02 to 0.5 greater than that of a polyester forming the polyester film A. The laminate film is curled in the widthwise direction with the polyester film B located inwardly of the curl. This film can be used for various applications, especially as a measuring tape, an adhesive tape and a base of a photographic film. As a preferred embodiment, a laminate polyester magnetic tape with reduced drop-out occurrence, comprising the stretch-oriented laminate film and a magnetic layer coated on one external layer thereof, the polyester film A forming one external layer of the laminate film having incorporated therein a finely-divided inert compound so that its coefficient of static friction becomes not more than 0.80, and the polyester film B forming the other external layer of the laminate film being a film having a coefficient of static friction greater than that of the polyester film A by at least 0.05 and a smoother surface, with the magnetic layer being coated on the surface of the polyester film B is disclosed.

31 Claims, 1 Drawing Figure

LAMINATE POLYESTER FILMS

This application is a continuation-in-part application of copending applications Ser. No. 467,291, filed May 6, 1974, and Ser. No. 478,325, filed June 11, 1974, both of which are now abandoned.

Prior art references related to the present application include the following.

U.S. Pat. No. 3,009,847 is relates to a magnetic recording tape and the process of manufacture thereof. The recording tape comprises a thin flexible polyethylene terephthalate base, an adhesive layer, and a layer of magnetically susceptible material. U.S. Pat. No. 3,117,901 discloses a flexible non-fibrous photogrpahic fiber base material, at least one surface of which is coated with a thin layer of an adhesive composition. U.S. Pat. No. 3,165,499 is directed to polymeric terephthalate ester fibers having been symmetrically biaxiallly oriented. U.S. Pat. No. 3,205,121 is related to magnetic recording tapes which comprise two base layers of polyethylene terephthalate bonded together by means of a resin-based adhesive, with a magnetizable layer being coated on the external surface of one of the base layers. U.S. Pat. No. 3,308,010 discloses laminate magnetic information cards having a reduced tendency to curl. U.S. Pat. No. 3,399,070 discloses a process for forming a synthetic textile yarn in which specks of colored material are embedded in a base web of synthetic material. U.S. Pat. No. 3,416,991 is directed to elongate plastic articles made up of a laminate of polymeric materials having curled longitudinal edges. U.S. Pat. No. 3,440,091 discloses a magnetic recording tape in which a layer of a conductive material is interposed between the magnetic and base layers. U.S. Pat. No. 3,515,626 is directed to laminates of oriented fibers of thermoplastic materials wherein one of the external layers of film contains an inert additive. U.S. Pat. No. 3,574,046 discloses biaxially-oriented films of polyethylene-1,2-diphenoxyethane-4,4'-dicarboxylate. The films are preferably heat-set. U.S. Pat. No. 3,620,896 is related to a laminate having at least two layers of materials of different coefficients of contraction. U.S. Pat. No. 3,790,435 discloses stretched or molecularly-oriented thermoplastic resin films containing a fine inorganic filler. U.S. Pat. No. 3,799,828 is directed to laminated synthetic papers consisting of a base layer of a biaxially-oriented plastic film containing a fine inorganic filler and at least one paper-like layer of a uniaxially-oriented plastic film. U.S. Pat. No. 3,841,943 discloses an apparatus for making a paper-like laminate of thermoplastic resin layers, one of which contains a fine inorganic filler. Netherlands Pat. No. 6,602,255 discloses a laminate comprising a plurality of layer of biaxially-oriented crystalline thermoplastic film, one of the external layers of which contains an inert filler.

This invention relates to a laminate polyester film of a novel structure and its use.

Generally, polyester films are important as plastic films because of their strength and thermal stability. We have now found that a novel and useful polyester laminate film having various superior properties not seen in the conventional polyester films in addition to the superior properties inherent to the polyester films can be obtained by preparing a laminate of two or three layers of polyester films in such a way that the two polyester films forming the outer layer of the laminate film are composed of two types of polyesters whose intrinsic viscosities differ from each other within a specific range.

The present invention provides a stretch-oriented laminate polyester film consisting of two or three layers of polyester films, both polyester film A and polyester film B forming both external layers of the laminate film being composed of a polyester having an intrinsic viscosity of 0.35 to 1.0, the intrinsic viscosity of a polyester forming the polyester film B is 0.02 to 0.5 greater than that of a polyester forming the polyester film A, the laminate film being curled in the widthwise direction with the polyester film B located inwardly of the curl.

The invention will be described below in greater detail.

The laminate film of this invention is a laminate of two or three layers of polyester films, and the two polyester films forming both external layers of the laminate film are composed of a polyester having an intrinsic viscosity (measure of molecular weight) of 0.35 to 1.0, preferably 0.4 to 0.9 , and the difference in intrinsic viscosity between the polyester forming one external layer and the polyester forming the other external layer is 0.02 to 0.5, preferably 0.03 to 0.2, and especially preferably 0.04 to 0.1. The laminate film of this invention may be composed only of the above-described two polyester films, or if desired, a third polyester film may be interposed between the two polyester films forming the external layers to form a three-layered laminate polyester film.

After the laminate polyester film so prepared has been stretched (preferably biaxially) and heat-set, the laminate film is curled in the widthwise direction (the direction at right angles to the machine direction) of the laminate film with the film having a higher intrinsic viscosity being located inwardly of the curl, because there is a difference in shrinkage stress between the polyester films forming the external layers which is ascribable to the difference in molecular weight. The laminate film so curled has very high stiffness as compared with a flat laminate film free from curling. Increased stiffness is very desirable in various uses of polyester films.

In the present application, the polyester film forming one external layer and composed of a polyester having a lower intrinsic viscosity is termed "polyester film A", and the polyester film forming the other external layer and composed of a polyester having a higher intrinsic viscosity is termed "polyester film B". The polyester film which may exist between the polyester films A and B is termed "polyester film C".

The polyester which forms the polyester films A, B and C in the laminate polyester film of this invention is a crystalline aromatic polyester, which embraces a homopolyester such as polyethylene terephthalate, polyethylene-2,6-naphthalate, polytetramethylene terephthalate, polytetramethylene-2,6-naphthalate or polycarbonate; a copolyester composed of at least 85 mol% of units derived from a monomer constituting the homopolyester and not more than 15 mol% of units derived from another ester-forming monomer; a blend of these polyesters; or a polymer blend consisting of at least 90% by weight of such a homopolyester or copolyester and not more than 10% by weight of another polymer which does not substantially affect the excellent properties of the polyester. Examples of the other polymer that can be used to prepare the polymer blend are polyamides such as polycaprolactam or polyhexamethylene adipamide, polyolefins such as polyethylene, polypropylene or polybutene-1, and vinyl polymers such as polystyrene.

The polyesters which constitute the polyester films A, B and C may be the same or different.

In order to impart good slipperiness to the laminate polyester film of this invention, a finely divided powder of an inert compound can be mixed and dispersed in the film. The fine particles of the inert compound may be incorporated in one or both of the polyester films A and B. Examples of suitable inert compounds are MgO, ZnO, $MgCO_3$, $CaCO_3$, $CaSO_4$, $BaSO_4$, $Al_2O_3$, $SiO_2$, $TiO_2$, terephthalates of Ca, Ba, Zn, or Mn, carbon black, graphite, and pigments. The shape of the particles of the inert compound may be rectangular or spherical. The particle diameter of the particles is not limited in particular. Usually, however, it is preferred that the arithmetic mean of the diameter of a particle in the direction of its maximum diameter and that in the direction of its minimum diameter is about 0.1–10 microns.

The finely divided inert compound may be added before or during the polymerization reaction of forming the polyester. Alternatively, it may be mixed with the polyester in an extruder when pelletizing it after the polymerization. It is also possible to add it during the melt-extrusion of the polyester into a sheet form and disperse it in the extruder. The amount of the inert compound to be added differs according to the properties of the film, and is not restricted in particular. Usually, the amount is 0.01 to 40% by weight, preferably 0.05 to 5% by weight, especially preferably 0.1 to 2% by weight, based on the weight of the polyester film A or the polyester film B.

When it is desired to color the laminate polyester film of this invention, it is preferred to form a three-layered laminate film using polyester film C which contains a dye or pigment. By so doing, the coloring agent is retained stably in the interlayer of the polyester film C without suffering from drop-off or separation owing to surface friction. Of course, it is possible to also incorporate a coloring agent into the polyester film A or B or both the polyester films A and B.

Polyester film C can also be used when it is desired to increase the thickness of the laminate film.

The laminate film of this invention can also contain other additives such as conventional stabilizers, delusterants, or antistatic agents. The thickness of the laminate polyester film of this invention is not particularly limited, but usually, it is preferred that the thickness be 1 to 2000 microns, especially 4 to 500 microns. The ratio of the thicknesses of the polyester films in the laminate film can be varied as desired. Generally, where an laminate polyester film is of a two-layered structure, it is preferred that the ratio of the thickness of each of the polyester films A and B to the thickness of the entire laminate film be adjusted to 5 to 95%. When a three-layered structure containing polyester film C is desired, the thickness of the polyester film C is optional. Especially when it is desired to increase the thickness of the entire laminate film, the thickness of the polyester film C is adjusted so that the thickness of the entire laminate film assumes the desired thickness.

Any known conventional laminating methods can be used to prepare the laminate polyester film of this invention by laminating the polyester films A and B, and if desired, the polyester film C also. One preferred method involves coextruding polyesters containing or not containing the inert compound for preparing the polyester films A, B and C, for example, to form a laminate film, and then stretching and heat-setting the laminate film obtained. The stretching of the laminate film can be performed either uniaxially or biaxially, but generally, it is preferred to stretch the laminate film in two directions successively or simultaneously.

As already stated, the laminate polyester film of this invention is curled in the widthwise direction, and because of this, has the advantage of possessing far higher stiffness than the conventional polyester film. Furthermore, the laminate polyester films of this invention have the following additional advantages. These additional advantages are more marked when the inert compound is incorporated into the laminate film of this invention.

At ordinary heat-setting temperatures for a laminate base film, a film of the low-molecular-weight polyester has a higher degree of crystallization when heat-set at the same temperature for the same period of time as compared to the film of high-molecular-weight polyester. When the degree of crystallization of a polyester film increases, its density becomes larger, and the abrasion resistance of the film increases. When the inert compound is dispersed in the polyester film A (lower-molecular-weight polyester), the degree of crystallization of the polyester film A is further increased by the action of the inert compound because this inert compound acts as a nucleating agent which promotes the crystallization of the polyester. As a result, coupled with the influences of the molecular weight as mentioned above, the degree of crystallization becomes very high in the polyester film A and the abrasion resistance of the polyester film A surface increases markedly. Accordingly, for applications which require that one surface of the laminate polyester film should have a high abrasion resistance, the laminate polyester film of this invention is very desirable. Furthermore, since the polyester of lower molecular weight has a higher end carboxyl group content than the polyester of higher molecular weight, a film of the polyester of lower molecular weight permits better adhesion to the inert compound added. Thus, the incorporation and dispersion of the inert compound in the polyester film A is also advantageous from the standpoint of preventing the drop-off and separation of the inert compound added.

In another preferred embodiment of this invention, there is provided a laminate polyester film whose longitudinal F-5 value has been adjusted to at least 12.0 $Kg/mm^2$ by properly choosing the stretching conditions for the laminate film. The "longitudinal F-5 value" denotes a value obtained by stretching a film sample 5% at room temperature and a relative humidity of 65% and at a pulling speed of 100% per minute using an ordinary tensile tester such as an Instron tensile tester, measuring the force exerted at this time on the sample, and expressing it in terms of $Kg/mm^2$ of the cross-sectional area of the sample before testing.

When polyethylene-2,6-naphthalate is used as the polyester, it is possible, and desirable, to adjust the longitudinal F-5 value to 16.0 $Kg/mm^2$ or more.

The laminate polyester film of this invention having a longitudinal F-5 value of at least 12.0 $Kg/mm^2$ (at least 16.0 $Kg/mm^2$ when polyethylene-2,6-naphthalate is used) can be prepared by any desired method. For example, such a laminate film can be prepared by stretching an unoriented laminate film at a ratio of 3.5 to 6.0, preferably 4.0 to 5.0, in the longitudinal direction, and at a ratio of 1.5 to 4.0, preferably 2.5 to 3.5, in the transverse direction, with the stretch ratio in the longitudinal direction being adjusted to at least 0.3, preferably at least 0.7, and especially preferably 1.0, higher than that in the transverse direction, and then heat-setting the stretched film. As a result of stretching the film so that the stretch ratio in the longitudinal direction is higher than that in the transverse direction, the laminate polyester film of this invention retains sufficient strength in the longitudinal direction, and even when the thickness of the laminate film is very much reduced, it still retains sufficient strength. This affords great advantages in various applications.

Because of the various superior properties, the laminate polyester films of this invention are useful in many applications, such as packaging films, molding films, films for outdoor uses, electrically insulating films, and metallizing films. Furthermore, by utilizing their high stiffness, the laminate polyester films of this invention are suitable as base films of adhesive tapes, measuring tapes, and magnetic cards. Decorative films can be made from them by applying desired colors.

As suitable uses of the laminate polyester films of this invention, there can be mentioned packaging films, molding films, films for outdoor uses, electrically insulating tapes, metallizing films, measuring tapes, and adhesive tapes having weatherability. Measuring tapes and adhesive tapes having superior weatherability and high stiffness have been required heretofore. Superior weatherability can be imparted to the laminate polyester film by using a blend of polyethylene terephthalate and polyethylene-2,6-naphthalate as at least one of the polyester films A and B forming the outermost layers of the laminate film.

The amount of the polyethylene-2,6-naphthalate differs according to the properties of the film desired. Usually, the suitable amount is, for example, 0.1 to 100% by weight, preferably 0.5 to 30% by weight, more preferably 1.0 to 10.0% by weight based on the weight of the polyester film A or the polyester film B.

It is presumed that when the surface composed of the blend of polethylene terephthalate and polyethylene-2,6-naphthalate is exposed to sunlight, this surface absorbs light of a short wavelength (high energy) region because of the polyethylene-2,6-naphthalate and thus inhibit the deterioration of the film. By blending polyethylene-2,6-naphthalate in one or both of the polyester film A (lower molecular weight polyester) and the polyester B (higher molecular weight polyester), the laminate polyester film of this invention possesses high stiffness and superior weatherability without deterioration of the superior strength and elongation inherent to the polyester.

Depending upon the combination of the intrinsic viscosity and the amount of the polyethylene-2,6-naphthalate added, the direction of the curl sometimes becomes reverse to that specified hereinabove. Thus, it is preferred to produce measuring tapes, adhesive tapes, etc., so that the surface to be exposed to the sunlight is located outwardly.

With a view to impart weatherability to the laminate film of this invention, an ultraviolet absorbent may be incorporated into at least one of the polyester films A and B.

Another suitable use of the laminate polyester film of this invention is as a base for photographic films. In the early days, films of nitrocellulose or cellulose diacetate were used as bases of photographic films, and later, cellulose triacetate films came into use. In recent years, polyester films have superseded these conventional materials because of the various advantages which the polyester films possess, such as superior transparency and mechanical strength, high heat distortion temperature, chemical stability, and inertness to photographic emulsions. However, when a photographic emulsion containing a hydrophilic polymer, such as gelatin, as a main binder is coated on the surface of a polyester film, curling occurs in the photographic film because of a great shrinkage and extension owing to changes in humidity. This phenomenon is also seen when using a cellulosic film, such as a triacetate film, as the base, but the degree of curling in this case is far larger than in the case of using a polyester film as the base. Since the curling of the photographic film causes a reduction in the efficiency of enlarging and printing works, films without curling are desired. Polyester films have reduced extension and contraction caused by changes in humidity as comapred with cellulosic films, but when dried excessively after coating a photographic emulsion, or allowed to stand at low humidity after development, curling occurs with the emulsion-coated surface situated inwardly. It is extrenely difficult to remove the curling completely. Previous attempts to remove curling include a method involving increasing the thickness of the polyester base film, or a method comprising coating an anti-curling agent on its surface, but these methods have many economic disadvantages.

When the laminate polyester film of this invention is used as a base film and a photographic emulsion is coated on the raised portion of this laminate film (that is, on the surface of the polyester film having a lower intrinsic viscosity), the curling of the photographic emulsion layer by shrinkage on drying and the curling of the base film itself negate each other, and the occurrence of curling in the entire photographic film is very much inhibited. Generally, the degrees of extension and contraction differ according to the types, number, thicknesses and properties of layers to be coated on the base film, such as primer layer, a photographic emulsion layer, a protective layer or an antihalation layer. Thus, if the degree of curling ascribable to the base film itself is controlled according to these factors of the coating layers so that it matches the extent of curling which may occur owing to the coating layers, it is possible to reduce the curling of the entire photographic film greatly.

In the case of a three-layered laminate film composed of polyester films A, B and C, the direction of curling is sometimes reversed depending upon the intrinsic viscosities of the polyester films A, B and C or the thickness of each layer. In such a case, it is preferred to coat an emulsion on the raised portion of the film. Since a high level of transparency is required for photographic uses, it is preferred not to incorporate the inert compound into such a photographic base film.

We have found that the degree of curling of the laminate polyester film of this invention is greater with a larger difference in intrinsic viscosity between both external layers, a smaller difference in thickness between both external layers, and a higher heat-setting temperature.

Photographic films prepared by using the laminate polyester films of this invention as base films are useful as roll films, motion-picture films, photographic films for plate-making, duplicating photographic films, 8-mm motion picture films, photographic dry plates, cut films, and roentgenographic films.

Furthermore, by coating a suitable shrinkable coating layer on the laminate polyester film of this invention instead of coating a photographic emulsion to balance the curling of the laminate film itself, there can be obtained a laminate film suitable for writing, drawing or printing.

Another preferred use of the laminate polyester film of this invention is as a raw material for producing split or slit fibers.

Various methods, such as a beating method, a buckling method, a false-twisting method or a cutting method, have been proposed so far for producing filaments by splitting a film-like material. All of such prior methods have the defect of requiring complicated equipment, and a high cost of production, and thus have poor economic advantages. Furthermore, the filaments produced are liable to be flattened, and have poor softness, bulkiness and covering properties, and thus present shapes and feel far remote from those of spun yarns.

The filaments obtained by splitting the laminate polyester film of this invention are curled helically because the difference in intrinsic viscosity between the surface and back of the filaments brings about a difference in shrinkage stress between them at the high temperatures employed at the time of splitting and at the time of swelling with solvents, the heat-treatment after the splitting, and the heat-treatment after stretching the film. As a result, the filaments obtained have far superior softness, bulkiness and covering properties to those obtained by the conventional methods while retaining the high tensile strength, knot strength, pluck strength and durability generally inherent in polyester fibers.

The split fibers can be prepared from the laminate polyester film of this invention by molecularly orienting the laminate film in the longitudinal direction either directly or after slitting it; and then splitting the film either mechanically or chemico-mechanically. Specific means for splitting include a method in which the oriented film is made into filaments by twisting or friction on a yarn winder, a yarn plier, or carding machine, a method in which the oriented film is beaten by a hammer such as a wedge or knife edge in the direction of stretching by rollers, or a method in which the oriented film is swollen with a solvent to render it easily splittable. The term "splitting" also denotes a procedure of producing a filament-like material having a uniform width using a microslit.

The resulting filaments are in various forms, such as a mass of completely separated filaments, or a mass of separated filaments with a part thereof being linked to each other, according to the method of production employed. Filaments having especially good softness, bulkiness and covering properties can be obtained when a film oriented in the longitudinal direction is split by twisting or friction, and the resulting filaments are collected in a cylindrical form and simultaneously the split portions or melt-adhered portions of the filaments are subjected to fuzzing or surface roughening treatments, or when the filaments are ballooned so that the fibers on the surface layer are melt-adhered partly.

The filaments so obtained have excellent softness, bulkiness, covering properties, and mechanical strength, and are useful as fishery materials such as ropes or fishing nets, packaging materials such as transportation bags, transporting cloths, packing cloths or automatic tying cords, construction materials such as various sheets and protective nettings, filter cloths, nettings, covers, sails, sewing threads, and beltings. The polyester filaments so obtained are especially useful for indoor and outdoor decorative purposes, for example, as carpets such as base cloths, carpet piles, mats, simple covering for a floor, wall materials such as wall paper, floor matting materials, curtains, interior decorative materials such as cushions, bed sheets, or table cloths. They are also useful for knitting, weaving, heat insulation, preparation of non-woven fabrics, preparation of paper-like sheets, and preparation of heat-insulating plates, and also as split fibers for treating heavy oils.

According to a preferred embodiment of the filaments of this invention there is provided a filament by metallizing the laminate polyester film and then splitting or slitting the metallized film. In this case, it is preferred to microslit the film to form bulky slit fibers, and such fibers are useful for decorative purposes. Furthermore, split fibers obtained from the laminate polyester film having a coloring agent dispersed therein instead of metallizing the film are also useful for decoration.

The following is directed to a magnetic tape comprising a stretch-oriented laminate polyester film and a magnetic layer, the tape being a preferred embodiment of this invention.

Generally, polyester films have superior strength, stiffness, abrasion resistance and heat resistance, and are suitable for use as base films of magnetic tapes. However, these polyester films exhibit poor slipping between themselves, and undergo creasing and blocking during their winding, slitting or coating. This not only impairs their operability, but also causes a reduction in the value of the resulting magnetic tapes. In particular, magnetic tapes are required to have good slipperiness (in other words, the coefficient of friction of the surface of the tape should be low) in order to ensure smooth running during winding on or unwinding from reels or cassettes. Attempts have, therefore, been made to render films having uneven surfaces suitable for use as bases of magnetic tapes by, for example: spraying or coating a finely divided powder on the surfaces of the films; adding particles of an inorganic substance when polymerizing the raw material or forming the polymer into the films; dispersing another polymer in the polyester; or forming fine particles of an insoluble catalyst residue in the polymer.

On the other hand, it is desirable to keep the size of magnetic tapes small and extremely thin in order to increase the amount of recording per unit volume of the magnetic recording tapes. To achieve this end, it is necessary not only to reduce the thickness of the base film, but also to reduce the thickness of the magnetic layer to be coated on the base film. When the surface of a film is rendered uneven in an attempt to improve the slipperiness of the base film, drop-out tends to occur in the magnetic layer (parts where the surface of the film is not coated with the magnetic layer), and therefore, it is impossible to make the magnetic layer thin.

Conversely, if the surface of the film is made smooth, the thickness of the magnetic layer can be reduced. However, its slipperiness becomes poor and the magnetic recording tape is deformed while being played, thus causing deviations in the reproduction of the recordings. Therefore, to impart superior running property to the magnetic recording tape is not compatible with the reduction in thickness of the magnetic layer, and it has been very difficult to provide these two characteristics in a consistent manner.

It is an object of this embodiment of the invention to overcome such difficulties, and provide a magnetic recording tape having a superior running property and containing an extremely thin magnetic layer without causing drop-out.

We have found that the above object of this invention can be achieved by a magnetic recording tape which is obtained by first providing a laminate film of polyester with one surface composed of a polyester film having good slipperiness and the other surface composed of a polyester film having smoothness, and coating a magnetic layer on the surface of the smooth polyester film. Specifically, the laminate film is prepared by providing an unoriented polyester laminate film in which only one surface of the top layer of the laminate film is composed of a polyester film having good slipperiness and the other surface of the laminate film is composed of a polyester film which is smooth but not slippery, and stretching and heat-setting the laminate film. Since no unevenness in slipperiness is imparted to the surface of the magnetic tape coated with the magnetic layer, drop-out does not substantially occur. Accordingly, the thickness of the magnetic layer coated can be extremely reduced, and by merely adding a small amount of an inert compound, a magnetic recording tape having good slipperiness can be prepared without hampering the superior properties of the polyester film itself.

The magnetic tape of this embodiment is a laminate polyester magnetic tape comprising a stretch-oriented laminate film consisting of two or three layers of polyester film and a magnetic layer coated on one external layer thereof, the polyester film A forming one external layer of the laminate film having incorporated therein a finely divided inert compound so that its coefficient of static friction becomes not more than 0.80, and the polyester film B forming the other external layer of the laminate film being a film having a coefficient of static friction at least 0.05 greater than that of the polyester film A and a smoother surface with the magnetic layer being coated on the surface of the polyester film B, whereby the occurrence of drop-out is reduced.

The polyester film forming one external layer of the two- or three- layered laminate polyester film has a surface with good slipperiness because of the uneven surface ascribable to the inert compound incorporated therein. This polyester film will be referred to as "polyester film A". The polyester film forming the other external layer of the laminate film has a smooth surface and therefore, has poor slipperiness as compared with the polyester film A. This polyester film will be referred to as "polyester film B". When the laminate film is composed of three layers, a third polyester film is interposed between the polyester films A and B. This polyester film will be referred to as "polyester film C" in the present specification and claims.

The polyester constituting these polyester films A, B and C is a crystalline aromatic polyester. For example, it may be a homopolyester, such as polyethylene terephthalate, polyethylene-2,6-naphthalate, polytetramethylene terephthalate, polytetramethylene-2,6-naphthalate, or polycarbonate; a copolyester consisting of at least 85 mol% of a constituent monomer of such a homopolyester and not more than 15 mol% of another ester-forming monomer; or a blend of these polyesters. It may also be a polymer blend consisting of at least 90% by weight of such a homopolyester or copolyester and not more than 10% by weight of another polymer which does not substantially affect the superior properties of the polyester. Examples of the other polymer that can be used for preparing the polymer blend are polyamides such as polycaprolactam or polyhexamethylene adipamide, polyolefins such as polyethylene, polypropylene or polybutene-1, and vinyl polymers such as polystyrene.

The intrinsic viscosity of the polyester is not particularly limited, but may vary according to the properties of the desired laminate film. For example, in the case of polyethylene terephthalate, the preferred intrinsic viscosity is usually 0.4 to 0.9, and in the case of polyethylene-2,6-naphthalate, the preferred intrinsic viscosity is 0.35 to 1.0. The intrinsic viscosity is measured in an o-chlorophenol solution at 35° C.

The polyesters which constitute the polyester films A, B and C may be the same or different.

The exposed surface of the polyester film A should have a coefficient of static friction of not more than 0.80, preferably not more than 0.60, and especially preferably not more than 0.48. The lower limit of the coefficient of static friction is not critical, but generally, it is 0.30. The coefficient of static friction is measured by the method of ASTM-D-1894-63 by joining two similar laminate films so that the surfaces of the polyester films A come into contact with each other.

In order to impart good slipperiness, the fine particles of an inert compound are dispersed in the polyester film A. Examples of such an inert compound are terephthalic acid salts of Ca, Ba, Zn, or Mn; MgO; ZnO; MgCO$_3$; CaCO$_3$; CaSO$_4$; BaSO$_4$; Al$_2$O$_3$; SiO$_2$; TiO$_2$; carbon black; graphite; and pigments. The particles of the inert compound may be of a rectangular shape or spherical shape. The size of the particles is not particularly limited. Usually, however, it is preferred that the arithmetic mean of the diameter of a particle in the direction of its maximum diameter and that in the direction of its minimum diameter is about 0.1 to 10 microns. The inert compound particles may be added before or during a polymerization reaction to form the polyester. Alternatively, the particles may be mixed with the polyester in an extruder when pelletizing. As a further alternative, the inert compound may be added at the time of melt-extruding the polyester into a sheet form and dispersed in the polyester in an extruder.

The amount of the inert compound to be added may vary according to the properties of the desired film, and is not particularly restricted. Usually, it is 0.01 to 40% by weight, preferably 0.05 to 5% by weight, especially preferably 0.1 to 2% by weight, based on the weight of the polyester film A.

As previously stated, the polyester film B should not contain the inert compound described above although it may contain a very small amount of the inert compound to an extent such that its surface is still maintained smooth. The coefficient of static friction (measured by the same method as described above except that the surfaces of the polyester films B are brought into contact with each other) should be greater than that of the polyester film A by at least 0.05, preferably at least 0.2 and especially preferably at least 0.5. Generally, the exposed surface of the polyester film B has a coefficient of static friction of at least 0.48, preferably at least 0.6, especially preferably at least 1.0.

The polyester film C is an optional component of the laminate polyester film. It is desirable to use a three-layered laminate containing the polyester film C, when it is desired to increase the thickness of the magnetic tape or to color the magnetic tape by including a coloring agent such as a dye or pigment into the polyester C. When the colored magnetic tape is desired, the coloring agent may also be incorporated in the polyester film A and/or the polyester film B in addition to the polyester film C. If desired, the magnetic tape of this invention may also contain other additives such as stabilizers, delusterants or antistatic agents.

Usually, any known method for lamination can be employed to form the laminate film as a base of the magnetic tape. For example, a process comprising extruding polyesters containing or not containing the inert compound by a co-extrusion method to prepare a laminate film, and then stretching and heat-setting the laminate film is preferred. The stretching may be uniaxial or biaxial, but generally, biaxial stretching is preferred wherein the laminate is stretched in two directions successively or simultaneously. In the co-extrusion method, it is a usual practice to cast molten polyesters from a die onto the surface of a casting drum, cool and solidify the laminate to form an unstretched laminate film, and then stretch and heat-set the laminate film. We have, however, found that the smoothness of the surface of the polyester film B is greatly increased by positioning the polyesters so that the surface of the polyester film A comes into contact with the air and the surface of the polyester film B comes into contact with the surface of the casting drum in the above coextrusion method. Therefore, the performance of the co-extrusion method in this way is most suitable for the preparation of the base laminate film used for the magnetic tape of this invention.

The thickness of the base stretch-oriented magnetic laminate film is not particularly limited, but usually it is 1 to 200 microns, especially preferably 6 to 50 microns.

The proportions of the thicknesses of the polyester films in the base laminate film can be varied as desired. Generally, however, it is preferred that the proportion of the thickness of the polyester film A is 5 to 50%, calculated on a weight basis, of the thickness of the base laminate film.

The magnetic tape of this invention can be obtained by coating a magnetic layer on the surface of the polyester film B of the base laminate film. The surface of the polyester film A of the magnetic tape of this invention so prepared has good slipperiness because of the fine unevenness formed on the surface by the presence of the inert compound. On the other hand, the surface of the polyester film B coated with the magnetic layer is smooth. Accordingly, even if the magnetic layer is considerably thinned, drop-out does not substantially occur, and it is possible to impart superior running property to the magnetic tape and, at the same time extremely reduce the thickness of the magnetic layer.

It has previously been thought that when slipperiness is increased by incorporating an inert compound in a polyester film to provide fine unevenness on its surface, the application of a magnetic layer to the surface of the film results in portions not coated with the magnetic layer, and it is difficult to render the magnetic layer thin. Furthermore, it has also been thought that the uneven portions of the uncoated surface of the film may be shaved off due to frictional contact to form waste matter which may adhere to the surface of the magnetic layer. As a result of the influence of these two factors, drop-out has been expected to occur to a marked extent. However, we have found that according to the present invention, the occurrence of drop-out is reduced by increasing the slipperiness.

A preferred embodiment of the magnetic tape is one in which at least one of the polyester film A and the polyester film B is a film of a blend of polyethylene-2,6-naphthalate and polyethylene terephthalate. This magnetic tape has the advantage of being excellently weatherable over prolonged periods of time. Preferably, the proportion of the polyethylene-2,6-naphthalate in the blend polymer is 0.1 to 49.0% by weight.

Furthermore, when a film of a polyester composed of 85 to 100 mol% of units of ethylene-2,6-naphthalate and 0 to 15 mol% of units of another ester-forming monomer is used as at least one of the polyester film A and the polyester film B, a magnetic tape of this invention having superior weatherability can be obtained. Thus, such a magnetic tape is preferred.

Another preferred embodiment of the magnetic tape is one in which fine particles of carbon black or graphite are used as the finely divided inert compound to be incorporated in the polyester film A to render the polyester film A electrically conductive. In addition to the above advantages, the magnetic tape having electrical conductivity has the advantage that the amount of static charge is reduced by allowing the static electricity occurring at the time of running, winding and unwinding the magnetic tape to be conducted away through the carbon black or graphite added surface, thereby preventing dust and dirt from being attracted to the tape by an electrostatic force. As a result, it is possible to reduce the occurrence of any drop-out resulting from the adhesion of dust and dirt to the magnetic layer. A further advantage of this type of magnetic tape is that noises caused by the static electricity at the time of recording and reproducing can be removed from the surface of the magnetic tape.

We have also found that in order to have the above superior properties exhibited sufficiently, the polyester A surface of the magnetic tape should desirably have a surface resistivity of less than $10^{12}$ ohms. In order to achieve this, it is desirable to increase the amount of carbon black or graphite usually to 10 to 40% by weight, preferably 15 to 25% by weight. The polyester of the film A containing carbon black or graphite in such a large amount generally has reduced film-formability, and such a film alone is difficult to stretch to an extent required for obtaining the desired mechanical strength. This difficulty can be overcome in accordance with this invention by using polyester films containing no inert compound as the polyester films B and C (when the film C is also used) and lining the polyester film A having reduced film-formability with the polyester films B and C having high film-formability by lamination, thereby enhancing the film-formability of the laminate film as a whole. Therefore, when carbon black or graphite is added to the polyester film A to render the magnetic tape electrically conductive, it is preferred not to add the inert compound to the polyester films B and C.

The kind of the carbon black to be added is not particularly restricted, but is preferably lamp black, thermal black, furnace black, or acetylene black.

The most preferred embodiment of the magnetic tape is one wherein both of the polyester film A and the polyester film B are composed of a polyester having intrinsic viscosity of 0.35 to 1.0, preferably 0.4 to 0.9 with the difference in the intrinsic viscosities between these two films being pre-set at 0.02 to 0.5, preferably 0.03 to 0.2, especially preferably 0.04 to 0.1, thereby making the tape to be curled in the widthwise direction. Thus, when as mentioned above, the polyester film A and the polyester film B forming both external layers of the base laminate film of the magnetic tape of this invention and comprising two kinds of polyesters having different intrinsic viscosities, namely different molecular weights, are laminated, stretched, preferably biaxially and then heat-set, the laminate film is curled in its widthwise direction with the film having a higher intrinsic viscosity being on the inwardly curled side because of the difference in the shrinkage stress ascribable to the difference in molecular weight between the two polyester films. The magnetic tape so bent has a greater stiffness than a flat tape and is free from bending. As a result, its windability is remarkably improved. Since good windability is one of the important properties required of the magnetic tape, this embodiment is very desirable. When only the advantage of increased stiffness of the base laminate film as a result of bending is considered, there is no particular preference in determining which of the polyester film A or the polyester film B is a polyester film having a lower intrinsic viscosity. However, when the film having a lower intrinsic viscosity is used as film A, there can be obtained an additional advantage that the extent to which the uncoated surface of the base laminate film (that is, the surface of the polyester film A which is not coated with the magnetic layer but is exposed) is shaved off by contacting with the capstan of a magnetic recording and reproducing device during the wind-up of the magnetic tape is considerably reduced, and that the adhesion of the inert compound to the polyester film A is improved.

At ordinary heat-setting temperatures, a low-molecular-weight polyester crystallizes at a higher rate than a high-molecular-weight polyester due to the difference in molecular weights. Therefore, a film of the low-molecular weight polyester has a higher degree of crystallization when heat-set at the same temperature for the same period of time. On the other hand, when the degree of crystallization of a polyester film increases, its density becomes greater and the abrasion resistance of the film increases. Accordingly, when a polyester film having a lower intrinsic viscosity (that is, a lower molecular weight) is used as the polyester film not coated with the magnetic layer (that is, the polyester film A), the shaving of the uncoated surface of the laminate film by contacting with the capstan can be reduced. Because the polyester film A contains a far greater amount of an inert compound than the polyester film B, this inert compound acts as a nucleating agent to promote the crystallization of the polyester film A. By the action of this nucleating agent, the polyester film A has a greater degree of crystallization than the polyester film B. Thus, in conjunction with the influences of the molecular weight described above, the degree of crystallization of the polyester film A causes a reduction in the shaving off by the contact with the capstan.

Furthermore, a low-molecular-weight polyester has a higher end carboxyl group content than a high-molecular-weight polyester, and therefore, the low-molecular-weight polyester film has greater adhesion to the inert compound added. Accordingly, the use of a low-molecular-weight polyester film as the polyester film A containing a large quantity of the inert compound is very convenient for preventing the separation of the inert compound added. If the separation of the inert compound occurs, it adheres to the surface of the magnetic tape to cause drop-out. It is very desirable therefore to prevent this separation. There is a tendency for the separation of the inert compound to be most marked when carbon black or graphite is used as the inert compound. Accordingly, this embodiment of the present invention is especially advantageous when carbon black graphite is used as the inert compound (for example, when it is desired to render the magnetic tape electrically conductive).

Another preferred embodiment of the magnetic tape of this invention is a magnetic tape whose longitudinal F-5 value has been adjusted to at least 12.0 Kg/mm$^2$ by properly choosing the stretching conditions for the base laminate film. A magnetic tape having a longitudinal F-5 value of at least 12.0 Kg/mm$^2$ can be obtained by stretching an oriented laminate base film at a stretch ratio of 3.5 to 6.0, preferably 4.0 to 5.0 in the longitudinal direction and at a stretch ratio of 1.5 to 4.0, preferably 2.5 to 3.5 in the transverse direction in a suitable manner so that the stretch ratio in the longitudinal directions is at least 0.3, preferably at least 0.7, especially preferably at least 1.0 greater than that in the transverse direction, heat-setting the stretched laminate film, and then coating a magnetic layer on the base laminate film. Thus, by stretching the film to a greater extent in the longitudinal direction than in the transverse direction, the magnetic tape of this invention has sufficient strength in the longitudinal direction when the thickness of the base laminate film is made very thin, the magnetic tape still retains sufficient strength. Therefore, the magnetic tape is neither injured or broken by the strong inertial force exerted at the time of starting and stopping the magnetic tape. The extremely thin laminate film that can be provided in this invention is very convenient for increasing the amount of recording per unit volume of the magnetic tape. When polyethylene naphthalate is used, it is possible, and desirable, to adjust the F-5 value to at least 16.0 Kg/mm$^2$.

The following Examples illustrate the present invention. The various properties described in the Examples were obtained by the following measuring methods.

Intrinsic viscosity

Measured on an o-chlorophenol solution of the polyester at 35° C., and expressed in 100 cc/g.

Stiffness

The method of measurement is illustrated in FIG. 1. A sample film 1 having a width of 1.27 cm and a length of 28 cm was taken out in the measuring direction (machine direction). The sample was placed flat, and a weight 2 was put on it. The angle $\theta$ formed between the sagging portion 3 measuring 7.5 cm in length and the perpendicular was made a measure of the stiffness of the film.

Wear loss

Measured in accordance with ASTM D1242-52T. Using a Taber wear tester, the amount of wear loss of a sample film was measured under a load of 1000 g using a wear ring CS-17. The speed of rotation was 70 cycles/min., and the number of rotations was 1000.

Density of each of the films constituting the laminate film

Each of the polyesters having different intrinsic viscosities to form the laminate polyester film was extruded under the same conditions using the same extruder as used in co-extruding these polyesters into the laminate film to form a film having the same thickness as the laminate film. The density of each of the films so obtained was measured, and it was assumed that the density was equal to that of each of the films forming the surface layers of the laminate film. The solvent used for the measurement of density was a mixture of n-heptane and chloroform.

EXAMPLE 1

Polyethylene terephthalate was prepared using as a catalyst 40 m-mol% of manganese acetate, 20 m-mol% of antimony trioxide and 40 m-mol% of phosphorous acid, the percentages being based on the weight of the starting dimethyl terephthalate. In this polymerization reaction, no inert compound was added, or a fine powder of kaolin having a particle diameter of 1 to 3 microns was added as an inert compound in an amount of 0.14% by weight or 0.28% by weight to form various polymers having intrinsic viscosities of 0.50, 0.65, or 0.85, and being free from kaolin or containing kaolin in the amount indicated.

Then, two polyesters of different intrinsic viscosities selected from the above polyesters were co-extruded using a conventional extruder so that the ratio of the thicknesses of the films was as indicated in Table 1, thereby to form five unstretched laminate polyester films shown in Runs Nos. 1 to 5 in Table 1. Each of the unstretched film was stretched first at a ratio of 3.4 in the longitudinal direction and then at a ratio of 3.8 in the transverse direction to form a laminate film having a thickness of 36 microns, and then heat-set for 30 seconds in hot air at 205° C. The stiffness, density and wear loss of the resulting films were measured, and the results are shown in Table 1.

The laminate films in Runs Nos. 1 to 5 were all curled in the widthwise direction with the polyester film having a higher intrinsic viscosity situated inwardly of the curling.

For comparison, the properties of polyester films having various intrinsic viscosities (without lamination) were measured. The results are shown in Comparative Examples 1 to 3. These films, even after heat-setting, exhibited a flat shape. Table 1 clearly shows that the laminate films have increased stiffness over flat single films.

In Table 1, the "surface" means a film having a higher intrinsic viscosity, and the "back" means a film of a lower intrinsic viscosity.

Table 1

|  |  | Runs Nos. | | | | | Comparative Runs No. | | |
|---|---|---|---|---|---|---|---|---|---|
|  |  | 1 | 2 | 3 | 4 | 5 | 1 | 2 | 3 |
| Ratio of thicknesses of the film (%) | Surface | 50 | 20 | 30 | 50 | 40 | Single film | Single film | Single film |
|  | Back | 50 | 80 | 70 | 50 | 60 |  |  |  |
| Amount of kaolin added (wt. %) | Surface | 0.14 | 0 | 0.14 | 0 | 0 | 0.14 | 0.14 | 0.14 |
|  | Back | 0 | 0.28 | 0.14 | 0.28 | 0 |  |  |  |
| Intrinsic viscosity of the film (100 cc/g) | Surface | 0.62 | 0.63 | 0.75 | 0.77 | 0.63 | 0.49 | 0.63 | 0.75 |
|  | Back | 0.50 | 0.49 | 0.62 | 0.61 | 0.48 |  |  |  |
| Thickness ($\mu$) | (*2) | 36 | 36 | 36 | 36 | 36 | 36 | 36 | 36 |
| (*1) Stiffness of each film | Surface (*3) | 49.0 | 48.0 | 47.5 | 49.5 | 48.0 | 42.5 | 42.0 | 43.0 |
|  | Back | 46.5 | 46.0 | 46.0 | 47.0 | 46.5 |  |  |  |
| Density of the film (g/cm$^3$) | Surface | 1.3972 | 1.3968 | 1.3955 | 1.3950 | 1.3970 | 1.4015 | 1.3972 | 1.3950 |
|  | Back | 1.4015 | 1.4019 | 1.3973 | 1.3975 | 1.4021 |  |  |  |
| Wear loss of each film (mg) | Surface | 27.0 | 33.5 | 23.5 | 35.5 | 33.5 | 17.7 | 22.2 | 25.9 |
|  | Back | 25.5 | 19.8 | 22.0 | 22.0 | 27.5 |  |  |  |

(*1) The stiffness of each of the films was measured only in the machine direction.
(*2) The measurement of stiffness was made with the surface of the film B directed upward.
(*3) The measurement of stiffness was made with the surface of the film A directed upward.

EXAMPLE 2

Laminate films were prepared in the same manner as in Example 1 except that kaolin as an inert compound was added to polyethylene-2,6-naphthalate having an intrinsic viscosity of 0.50 and 0.63 respectively, and the stretching of the film was carried out first in the longitudinal direction at a stretch ratio of 3.4 and then in the transverse direction at a stretch ratio of 3.7 to form a film having a thickness of 23 microns, and then heat-set for 30 seconds at 230° C. The stiffness, density and wear loss of the resulting laminate films were measured, and the results are shown in Run No. 1 in Table 2.

For comparison, the properties of the single polyester films not laminated were also measured, and the results are shown in Comparative Run Nos. 1 to 2. Table 2 clearly shows that when polyethylene-2,6-naphthalate was used as the polyester, the results were the same as in Example 1.

Table 2

|  |  | Run No. | Comparative Runs No. | |
|---|---|---|---|---|
|  |  | 1 | 1 | 2 |
| Ratio of thickness of the film (%) | Surface | 50 | Single film | Single film |
|  | Back | 50 |  |  |
| Amount of kaolin added (wt %) | Surface | 0 | 0.14 | 0.14 |
|  | Back | 0.14 |  |  |
| Intrinsic viscosity of the film (100 cc/g) | Surface | 0.60 | 0.48 | 0.61 |
|  | Back | 0.48 |  |  |
| Thickness ($\mu$) |  | 23 | 23 | 23 |
| (*1) | (*2) Surface | 34.0 |  |  |

Table 2-continued

|  |  | Run No. 1 | Comparative Runs No. 1 | Comparative Runs No. 2 |
|---|---|---|---|---|
| Stiffness of each film |  |  | 29.0 | 29.5 |
|  | (*3) Back | 32.5 |  |  |
|  | Surface | 1.3597 |  |  |
| Density of the film (g/cm³) |  |  | 1.3613 | 1.3596 |
|  | Back | 1.3613 |  |  |
|  | Surface | 57.9 |  |  |
| Wear loss of each film (mg) |  |  | 49.3 | 57.1 |
|  | Back | 48.5 |  |  |

(*1), (*2) and (*3) are the same as defined in Table 1.

EXAMPLE 3

Polyethylene terephthalates having intrinsic viscosities of 0.50, 0.65, and 0.85 were prepared in the same manner as in Example 1 without inert compound or adding a fine powder of kaolin having a particle diameter of 1 to 3 microns in an amount of 0.14% by weight. Using two of these polyesters having different intrinsic viscosities laminate polyester films of this invention (Run Nos. 1 to 6) as shown in Table 3 were prepared in the same manner as in Example 1. In these Runs, the films were stretched biaxially in a successive way at the stretch ratios in the longitudinal and transverse directions as indicated in Table 3 to form laminate films having a thickness of 36 microns, and then heat-set for 30 seconds with hot air held at the temperatures indicated in Table 3. Furthermore, in any of the Runs, kaolin was incorporated into the polyester film A (described as the "back" in the table) having a lower intrinsic viscosity and kaolin was not incorporated into the polyester film B (described as the "surface" in the table) having a higher intrinsic viscosity. The strength, elongation, F-5 value, stiffness, density and wear loss of each of the resulting films are shown in Table 3.

For comparision, the properties of the polyester films having the various intrinsic viscosities as single films without lamination are also shown as Comparative Runs Nos. 1 to 4 in Table 3.

Table 3

| | Ratio of thickness of the films (%) | | Amount of kaolin added (wt. %) | | Intrinsic viscosity of each film (100 cc/g) | | Stretching ratio (longitudinal × transverse) | Heat-setting temperature (°C.) |
|---|---|---|---|---|---|---|---|---|
| | Surface | Back | Surface | Back | Surface | Back | | |
| Runs Nos. | | | | | | | | |
| 1 | 30 | 70 | 0 | 0.14 | 0.63 | 0.50 | 3.9 × 3.7 | 205 |
| 2 | 30 | 70 | 0 | 0.14 | 0.63 | 0.50 | 4.4 × 3.3 | 195 |
| 3 | 30 | 70 | 0 | 0.14 | 0.75 | 0.62 | 4.4 × 3.3 | 195 |
| 4 | 50 | 50 | 0 | 0.14 | 0.63 | 0.50 | 3.9 × 3.7 | 205 |
| 5 | 50 | 50 | 0 | 0.14 | 0.63 | 0.50 | 4.4 × 3.3 | 195 |
| 6 | 50 | 50 | 0 | 0.14 | 0.75 | 0.62 | 4.4 × 3.3 | 195 |
| Comparative Runs Nos. | | | | | | | | |
| 1 | Single film | | 0.14 | | 0.63 | | 3.5 × 3.8 | 205 |
| 2 | Single film | | 0.14 | | 0.50 | | 4.4 × 3.3 | 195 |
| 3 | Single film | | 0.14 | | 0.62 | | 4.4 × 3.3 | 195 |
| 4 | Single film | | 0.14 | | 0.75 | | 4.4 × 3.3 | 195 |

Physical Properties of Stretched Films

| | Thickness (μ) | (*1) Stiffness (*2) Surface | (*1) Stiffness (*3) Back | Density of film (g/cm³) Surface | Density of film (g/cm³) Back | Wear loss (mg) Surface | Wear loss (mg) Back | Elongation at break (%) | | Strength at break (kg/mm²) | F-5 Value (kg/mm²) |
|---|---|---|---|---|---|---|---|---|---|---|---|
| Runs Nos. | | | | | | | | | | | |
| 1 | 36 | 52.0 | 47.5 | 1.3943 | 1.3987 | 40 | 31 | MD | 91 | 35 | 13.6 |
|  |  |  |  |  |  |  |  | TD | 133 | 24 | 10.5 |
| 2 | 36 | 55.0 | 47.5 | 1.3939 | 1.3985 | 42 | 32 | MD | 69 | 42 | 15.5 |
|  |  |  |  |  |  |  |  | TD | 135 | 33 | 10.9 |
| 3 | 36 | 54.5 | 47.0 | 1.3913 | 1.3942 | 46 | 35 | MD | 75 | 43 | 15.8 |
|  |  |  |  |  |  |  |  | TD | 140 | 31 | 11.1 |
| 4 | 36 | 54.5 | 49.0 | 1.3943 | 1.3987 | 41 | 32 | MD | 110 | 36 | 13.7 |
|  |  |  |  |  |  |  |  | TD | 135 | 23 | 10.3 |
| 5 | 36 | 56.5 | 50.5 | 1.3939 | 1.3985 | 40 | 33 | MD | 70 | 43 | 15.6 |
|  |  |  |  |  |  |  |  | TD | 137 | 32 | 10.7 |
| 6 | 36 | 56.0 | 51.5 | 1.3913 | 1.3942 | 46 | 37 | MD | 77 | 42 | 15.9 |
|  |  |  |  |  |  |  |  | TD | 138 | 33 | 10.7 |
| Comparative Runs Nos. | | | | | | | | | | | |
| 1 | 36 | 41.5 |  | 1.4013 |  | 21 |  | MD | 120 | 22 | 10.8 |
|  |  |  |  |  |  |  |  | TD | 99 | 24 | 11.8 |
| 2 | 36 | 44.5 |  | 1.3985 |  | 30 |  | MD | 55 | 40 | 15.1 |
|  |  |  |  |  |  |  |  | TD | 130 | 29 | 10.9 |
| 3 | 36 | 45.0 |  | 1.3942 |  | 35 |  | MD | 57 | 42 | 15.8 |
|  |  |  |  |  |  |  |  | TD | 135 | 31 | 10.7 |
| 4 | 36 | 46.0 |  | 1.3916 |  | 39 |  | MD | 60 | 44 | 15.6 |

| | | | | TD | 137 | 34 | 10.8 |

(Note)
1*, 2* and 3* in Table 3 are same as defined in Table 1.

EXAMPLE 4

Polyethylene-2,6-naphthalate polymer having an intrinsic viscosity of 0.57 and polyethylene terephthalate polymers having an intrinsic viscosity of 0.65 and 0.55 respectively were prepared in the same way as in Examples 1 and 2. Then, the above polymers were co-extruded by a conventional co-extruding machine so that the films obtained had the polyethylene-2,6-naphthalate content as indicated in Table 4, and the thickness of each of the constituent films was as indicated in Table 4. There were prepared two unstretched laminate polyester films (Runs Nos. 1 and 2). Then, each of the films was stretched in the longitudinal direction at a stretch ratio of 3.6, and then in the transverse direction at a ratio of 4.1 to form a film having a thickness of 45 microns, and then heat-set for 30 seconds with hot air at 215° C. The intrinsic viscosity and stiffness of the resulting films were measured. Also, the polyethylene terephthalate film surface and the polyethylene terephthalate/polyethylene-2,6-naphthalate blend film surface of the laminate polyester film were each exposed to a high-pressure mercury lamp as a substitute for the sunlight for the predetermined periods of time, and then the strength and elongation of the deteriorated films were measured. The results are shown in Table 4.

The laminate films in Run Nos. 1 and 2, after heat-setting were curled in the widthwise direction with the polyester film having a higher intrinsic viscosity situated inwardly of the curling.

For comparison, the results with a film composed only of polyethylene terephthalate without blending polyethylene-2,6-naphthalate are shown in Table 5 as Comparative Run No. 1. Even after heat-setting, this film exhibited a flat shape. The laminate films using a blend of polyethylene terephthalate and polyethylene-2,6-naphthalate had very much increased stiffness over the flat single film because of the curled shape. Table 4 clearly shows that the laminate films containing a blend of polyethylene terephthalate and polyethylene-2,6-naphthalate have very good weatherability as demonstrated by the results of the irradiation of a high pressure mercury lamp to the surface of the film containing the polyethylene-2,6-naphthalate.

In Table 4, the "surface" means a film having a higher intrinsic viscosity, and the "back" means a film having a lower intrinsic viscosity.

The intrinsic viscosity of the surface and back film (films A and B) was measured on samples extracted separately at the time of melt-extrusion.

Table 4

| Runs Nos. | | | 1 | | 2 | |
|---|---|---|---|---|---|---|
| PEN Content in polyester film A (wt. %) | | | | | 5 | |
| Intrinsic viscosity (100 cc/g) Surface/Back | | | | | 0.594/0.504 | |
| (*1) Stiffness | (*2) Surface | | 48.5 | | 48.0 | |
| | (*3) Back | | 46.5 | | 45.5 | |
| Proportion ( surface/back ) = ( PET/(PET + PEN) ) | | | 50/50 | | 70/30 | |
| Irradiated Surface | | | PET Surface | (PET+PEN) surface | PET Surface | (PET+PEN) Surface |
| Direction | | | MD  TD | MD  TD | MD  TD | MD  TD |
| Irradiating time (hours) | Blank (0) | Elongation at break (%) | 105.3  71.2 | | 100.3  70.0 | |
| | | Strength at break (kg/cm²) | 2160  2600 | | 2140  2940 | |
| | 60 | Elongation at break (%) | 2.7  25.5 | 58.6  32.5 | 2.3  13.4 | 49.5  21.3 |
| | | Strength at break (kg/cm²) | 830  1750 | 1580  1920 | 690  1350 | 1450  1690 |
| | 120 | Elongation at break (%) | 1.9  17.3 | 45.3  44.3 | 1.8  19.3 | 15.4  21.0 |
| | | Strength at break (kg/cm²) | 680  1470 | 1430  1970 | 610  1200 | 1120  1490 |

Note
(1*), (2*) and (3*) are the same as defined in Table 1. MD stands for machine direction, and TD, transverse direction.

Table 5

| Comparative Example | | | | 1 | |
|---|---|---|---|---|---|
| Constituent | | | | PET alone | |
| Intrinsic viscosity (100 cc/g) | | | | 0.594 | |
| Stiffness (*1) | | | | 41.8 | |
| Irradiated surface | | | | PET surface | |
| Direction | | | | MD | TD |
| Irradiating time (hours) | Blank (0) | Elongation at break (%) | | 102.3 | 93.6 |
| | | Strength at break Kg/cm² | | 2440 | 2580 |
| | 60 | Elongation at break (%) | | 2.1 | 16.3 |
| | | Strength at break (kg/cm²) | | 750 | 1360 |
| | 120 | Elongation at break (%) | | 1.8 | 1.8 |
| | | Strength at break Kg/cm² | | 680 | 720 |

PET polyethylene terephthalate
MD machine direction (longitudinal direction)
TD transverse direction
(1*) ... The stiffness of the film was measured only in the machine direction.

Example 5

A film having an intrinsic viscosity of 0.61 obtained by extruding polyethylene terephthalate alone and a film having an intrinsic viscosity of 0.56 obtained by extruding polyethylene terephthalate alone were laminated by the co-extruding method to form a laminate film in which the ratio of thicknesses of the two constituent films was 30:70. The laminate film was biaxially stretched first in the longitudinal direction at a ratio of 3.0, and then in the transverse direction at a ratio of 3.3, and then heat-set for 30 seconds at 210° C. at constant length to form a film having a thickness of 100 microns.

A primer layer comprising a hydrophilic copolymer of vinyl acetate and maleic anhydride was coated on the raised portion (surface having a lower intrinsic viscosity) of the resulting laminate polyethylene terephthalate film, and dried at 60° C. for 10 seconds, followed by heat-treatment at 130° C. for 7 minutes. Then, an ordinary silver halide emulsion for negative was coated on it in a thickness of 20 microns and dried.

For comparison, a single-layer film having an intrinsic viscosity of 0.61 and the same thickness was prepared under the same film-making conditions. The extent of curling of the film was measured when the film was allowed to stand at a predetermined humidity before and after the development. The results are shown in Table 6.

The curl value as a measure of the extent of curling which was used in Table 6 was measured in the following way. A circular sample with a diameter of 100 mm was cut out from the film of which curl value was to be measured. The sample was allowed to stand at a predetermined relative humidity for 48 hours to induce curling. When the curled circular sample was placed on a flat plate, for example, a glass plate, with the curled portion situated underside, this sample makes contact with the flat plate at two points on the circumference. The distance (X mm) between the two points was measured by means of a catheto-meter. The curl value is expressed in (100−X) mm. The curl toward the emulsion-coated surface was indicated by +, and the curl toward the opposite surface by −. The results are shown in Table 6.

Table 6

| | Based film | Curl value before development | | Curl value after development | |
|---|---|---|---|---|---|
| | | 30% RH | 70% RH | 30% RH | 70% RH |
| Example | Laminate film | + 1.3 | − 0.3 | + 2.1 | + 0.3 |
| Comparative Example | Single film | + 17.0 | + 6.1 | + 16.5 | + 5.3 |

*RH means a relative humidity.

From the results of Table 6, it is clear that the photographic films prepared by using the laminate films of this invention as bases have very much reduced degrees of curling.

EXAMPLE 6

A film having an intrinsic viscosity of 0.62 when obtained by extruding polyethylene terephthalate alone and a film having a intrinsic viscosity of 0.50 when obtained by extruding polyethylene terephthalate alone were laminated with the ratio of the thicknesses between the two constituent films being adjusted to 1:1, and then stretched in the longitudinal direction at a ratio of 4.0 to form a laminate film having a thickness of 90 microns. The film obtained was passed between rubbery plates, and pressure was applied to the film in a direction perpendicular to the stretching direction to split it into monofilaments having an average size of 1600 denier. The filaments were twisted in an atmosphere at 300° C. to an extent of about 1000 turns per meter, and bundled while partly fusing the filaments to form a yarn. The yarn exhibited good knittability and weavability, and had good feel. Moreover, the yarn had excellent softness, bulkiness and covering properties as compared with split fibers obtained from a single film formed under the same conditions.

EXAMPLE 7

A film having an intrinsic viscosity of 0.60 when obtained by extruding polyethylene-2,6-naphthalate alone and a film having an intrinsic viscosity of 0.48 when obtained by extruding polyethylene-2,6-naphthalate alone were laminated so that the ratio of the thicknesses of the constituent films was adjusted to 4:6. The laminate film was stretched in the longitudinal direction at a ratio of 4.5. The film obtained was passed through rubbery plates, and pressure was applied to it in a direction perpendicular to the stretching direction to split it into filaments having an average size of 1000 denier. The filaments were twisted to an extent of about 1000 turns per meter, and bundled while partly fusing them to form a yarn. The resulting yarn had good knittability and weavability, and superior feel. The yarn also had excellent softness, bulkiness and covering properties as compared with a yarn obtained by splitting a single film prepared under the same conditions.

The magnetic tape embodiment of this invention will be illustrated further by the following Examples. The various properties of the magnetic tape were measured by the methods described below.

Drop-out

Video recording was performed on the magnetic tape. Drop-outs were detected, and those ascribable to the base film of the magnetic tape were counted. The number of such drop-outs for each area measuring 12.5 mm in width and 6 m in length was determined.

Stiffness

The same method of measurement previously described was used.

Wear loss

Wear loss was measured as previously described.

Surface resistivity

Electrodes having a length of 50 mm and a width of 10 mm were mounted on the electrically conductive layer of a sample film, and the electric resistance R of the surface was measured when the distance between the electrodes was 50 mm. $R_s$, which expresses the surface resistivity of the film in ohms per unit area, was obtained in accordance with the following equation.

$$R_s = R \times d/l$$

wherein
$R_s$ is the surface resistivity (ohms),
R is the resistance between the electrodes (ohms),
d is the length of each electrode, and
l is the distance between the electrodes.

Haze

Using an integrating sphere-type light transmittance measuring device, the amount of incident light ($T_1$), the amount of entire light transmitted ($T_2$), the amount of light scattered by the device ($T_3$), and the amount of light scattered by the device and the test piece used ($T_4$) were measured, and the haze of the test piece was calculated in accordance with the following equation.

$$\text{Haze} = \frac{T_d}{T_t} \times 100 \, (\%)$$

wherein $T_t = \frac{T_2}{T_1} \times 100$

The properties of the base films and the magnetic tapes are shown in Table 7.

Table 7 also shows the properties of base films consisting only of either the polyester film A or B and magnetic tapes obtained by coating (in the same manner as above) the magnetic layer on such base films. (Comparative Runs Nos. 1 to 4).

Table 7

| Runs | Proportion of thickness of each film (%)* Film B | Proportion of thickness of each film (%)* Film A | Amount of kaolin added (wt. %) Film B | Amount of kaolin added (wt. %) Film A | Base film Thickness (μ) | Base film Wind-up condition | Coefficient of static friction (μs) Film A | Coefficient of static friction (μs) Film B** | Magnetic tape Running property | Magnetic tape Number of drop-outs |
|---|---|---|---|---|---|---|---|---|---|---|
| 1 | 80 | 20 | 0 | 0.14 | 33 | Good | 0.48 | >4.0 | Good | 2–3 |
| 2 | 70 | 30 | 0 | 0.14 | 15 | Good | 0.55 | >4.0 | Good | 2–3 |
| 3 | 80 | 20 | 0 | 0.28 | 33 | Good | 0.47 | >4.0 | Good | 2–3 |
| 4 | 70 | 30 | 0 | 0.28 | 15 | Good | 0.50 | >4.0 | Good | 2–3 |
| 5 | 50 | 50 | 0 | 0.14 | 33 | Good | 0.46 | >4.0 | Good | 2–3 |
| 6 | 50 | 50 | 0.01 | 0.14 | 15 | Good | 0.50 | 0.89 | Good | 2–3 |
| Comparative Runs | | | | | | | | | | |
| 1 | — | 100 | — | 0.28 | 33 | Good | 0.36 | — | Good | 20 |
| 2 | — | 100 | — | 0.14 | 23 | Good | 0.47 | — | Good | 15 |
| 3 | 100 | — | 0 | — | 33 | Poor | — | >4.0 | Poor, creased, not processable | — |
| 4 | 100 | — | 0.01 | — | 23 | Poor | — | 0.90 | Poor | 2–3 |

*The proportion of the thickness of the film was expressed by the proportion of the weight of the film per unit area.
** The device for measuring the coefficient of static friction could not measure values larger than 4.0. Therefore, values larger than 4.0 are all shown as >4.0.

$$T_d = \frac{T_4 - T_3(T_2/T_1)}{T_1} \times 100.$$

EXAMPLE 8

Dimethyl terephthalate was polymerized using as a catalyst a mixture of 40 m-mol% of manganese acetate, 20 m-mol% of antimony trioxide and 40 m-mol% of phosphorous acid. 0.14% by weight or 0.28% by weight of a fine powder of kaolin having a particle diameter of 1 to 3 microns was added to form polyethylene terephthalate having an intrinsic viscosity of 0.65. The resulting polyester was used for preparing polyester film A.

On the other hand, the above procedure was repeated except that the fine powder of kaolin was not used at all, or used in an amount of as small as 0.01% by weight, to form polyethylene terephthalate having an intrinsic viscosity of 0.65. The resulting polyester was used for preparing polyester film B.

By using an ordinary co-extruding apparatus, the two polyesters thus obtained were co-extruded to form six base laminate films, each composed of the polyester films A and B (Runs Nos. 1 to 6 in Table 7). At this time, the laminate film was cooled and solidified by making arrangements so that the surface of the polyester film B came into contact with the surface of a casting drum and the surface of the polyester film A came into contact with the air. Then, the solidified laminate film was stretched biaxially first in the longitudinal direction at a ratio of 3.6, and then in the transverse direction at a ratio of 4.1, and heat-set for 30 seconds in hot air held at 205° C.

A magnetic layer consisting of acicular α-type ferric oxide and a binder (a copolymer of vinyl acetate and vinyl chloride) was coated to a thickness of 5 microns to form a magnetic recording tape. The running property and drop-out of the tape were measured.

EXAMPLE 9

Ethylene-2,6-naphthalate was polymerized in a customary manner to form a polymer having an intrinsic viscosity (measured on an o-chlorophenol solution at 35° C.) of 0.64. In the above polymerization, 0.14% by weight or 0.28% by weight of a fine powder of kaolin having a particle diameter of 1 to 3 microns was added. The resulting polymer was used for preparing polyester film A.

On the other hand, the above procedure was repeated except that the fine powders of kaolin were not at all used or used in an amount as small as 0.01% by weight. The resulting polymer was used for preparing polyester film B.

Five laminate films were prepared in the same way as in Example 8, as shown in Runs Nos. 1 to 5 in Table 8. In Runs Nos. 1 to 4, the films were stretched biaxially, first in the longitudinal direction at a ratio of 3.6 and then in the transverse direction at a ratio of 3.9. In Run No. 5, the film was stretched uniaxially in the longitudinal direction at a ratio of 3.6, and then heat-set for 30 seconds in hot air held at 215° C. Otherwise, the procedure was quite the same as in Example 8.

The magnetic layer of Example 8 was coated in the same way as in Example 8 onto the surface of the polyester film B of the laminate film to produce a magnetic tape. The various properties of the base laminate films and magnetic films obtained were measured, and the results are shown in Table 8.

Furthermore, in the same way as in Example 8, magnetic tapes were prepared using either the polyester film A or the polyester film B alone as a base. The properties of the base films and the magnetic tapes obtained were measured, and shown in Table 8 as Comparative Runs Nos. 1 to 3.

The base laminate films of this Example formed only of polyethylene-2,6-naphthalate is characterized by having superior transparency as shown in Table 8. The magnetic tapes of this invention using these laminate films as bases are characterized by having superior running property and very much reduced number of drop-outs, similar to the magnetic tapes of this invention obtained in Example 8.

polyester film having a higher intrinsic viscosity was used as the polyester film A, and Runs Nos. 2 and 3 show the case where the polyester film having a lower intrinsic viscosity was used as the polyester film A. In all cases, after heat-setting, the laminate films obtained exhibited curly bending in the widthwise direction with the polyester film having a higher intrinsic viscosity positioned inwardly of the bent position.

For comparison, polyester films having various intrinsic viscosities were each used alone (Comparative Runs Nos. 1 to 3). These films were flat even after heat-setting. Table 9 clearly shows that the laminate films have greater stiffness than the flat non-laminated films owing to the bent configuration.

It is also clearly appreciated from the results shown in Table 9 that the laminate films in Runs Nos. 2 and 3 in which the polyester film A has a lower intrinsic viscosity than the polyester film B have reduced wear loss of the polyester film A as compared with the laminate film of Run No. 1.

Magnetic tapes were produced by coating the same magnetic layer as used in Example 8 on the surface of the polyester film B of each of the laminate films in Runs Nos. 1 to 3. These magnetic tapes had superior running property, extremely reduced occurrence of drop-outs, and very good winding characteristics.

Table 8

| Runs | Proportion of thickness of each film % Film B | Proportion of thickness of each film % Film A | Amount of kaolin added (wt. %) Film B | Amount of kaolin added (wt. %) Film A | Base film Thickness (μ) | Base film Wind-up condition | Base film Coefficient of static friction ($\mu_s$) Film A | Base film Coefficient of static friction ($\mu_s$) Film B | Base film Haze | Magnetic tape Running property | Magnetic tape Number of drop-outs |
| --- | --- | --- | --- | --- | --- | --- | --- | --- | --- | --- | --- |
| 1 | 80 | 20 | 0 | 0.28 | 33 | Good | 0.47 | >4.0 | 4.47 | Good | 2-3 |
| 2 | 70 | 30 | 0 | 0.14 | 15 | Good | 0.56 | >4.0 | 2.13 | Good | 2-3 |
| 3 | 50 | 50 | 0 | 0.28 | 33 | Good | 0.47 | >4.0 | 9.23 | Good | 2-3 |
| 4 | 50 | 50 | 0.01 | 0.14 | 15 | Good | 0.39 | 0.95 | 3.03 | Good | 2-3 |
| 5 | 70 | 30 | 0 | 0.14 | 50 | Good | 0.57 | >4.0 | 6.57 | Good | 2-3 |
| Comparative Runs | | | | | | | | | | | |
| 1 | — | 100 | — | 0.28 | 33 | Good | 0.37 | — | 14.90 | Good | 20 |
| 2 | 100 | — | 0 | — | 33 | Poor | — | >4.0 | 0.75 | Poor, creased, not processable | — |
| 3 | 100 | — | 0.01 | — | 15 | Poor | — | 0.98 | 0.93 | Poor | 2-3 |

EXAMPLE 10

Dimethyl terephthalate was polymerized using 40 m-mol% of manganese acetate, 20 m-mol% of antimony trioxide and 40 m-mol% of phosphorous acid as a catalyst and adding kaolin as an inert compound in the various proportions shown in Table 9 to prepare polymers having an intrinsic viscosity of 0.50, 0.65, and 0.85, respectively. The kaolin used was in the form of fine powders having a particle diameter of 1 to 3 microns.

By the same method as described in Example 8, laminate films were prepared each of which consisted of polyester film A containing the inert compound and polyester film B not containing it. The only difference from Example 8 was that the laminate films were biaxially stretched in the longitudinal direction at a ratio of 3.4 and then in the transverse direction at a ratio of 3.8. The various properties of the resulting laminate films were measured, and the results are shown in Table 9 as Runs Nos. 1 to 3. Run No. 1 shows the case where the Table 9

| | | Runs Nos. 1 | Runs Nos. 2 | Runs Nos. 3 | Comparative Runs Nos. 1 | Comparative Runs Nos. 2 | Comparative Runs Nos. 3 |
| --- | --- | --- | --- | --- | --- | --- | --- |
| Proportion of the thickness of each film (%) | Film B | 50 | 20 | 50 | — | — | — |
| | Film A | 50 | 80 | 50 | — | — | — |
| Amount of kaolin added (wt. %) | Film B | 0 | 0 | 0 | 0.14 | 0.14 | 0.14 |
| | Film A | 0.14 | 0.28 | 0.28 | | | |
| Intrinsic viscosity of the films (100cc/g) | Film B | 0.50 | 0.63 | 0.77 | 0.49 | 0.63 | 0.75 |
| | Film A | 0.62 | 0.49 | 0.61 | | | |
| Thickness (μ) | | 36 | 36 | 36 | 36 | 36 | 36 |
| Stiffness of each film* | Film B | 46.5 | 48.0 | 49.5 | 42.5 | 42.0 | 43.0 |
| | Film A | 49.0 | 46.5 | 47.0 | | | |
| Density of each film (g/cm$^3$) | Film B | 1.4015 | 1.3968 | 1.3950 | 1.4015 | 1.3972 | 1.3950 |
| | Film A | 1.3972 | 1.4019 | 1.3975 | | | |
| Wear loss of each film | Film B | 25.5 | 33.5 | 35.5 | 17.7 | 22.2 | 25.9 |

Table 9-continued

|  |  | Runs Nos. | | | Comparative Runs Nos. | | |
|---|---|---|---|---|---|---|---|
|  |  | 1 | 2 | 3 | 1 | 2 | 3 |
| (mg) | Film A | 27.0 | 19.8 | 22.0 | | | |

*The stiffness of the film was measured only in the machine direction. The stiffness for film B was measured by positioning the film B surface of the laminate film facing upwards and the stiffness for film A was measured by positioning the film A surface of the laminate film facing upwards.

* The stiffness of the film was measured only in the machine direction. The stiffness for film B was measured by positioning the film B surface of the laminate film facing upwards and the stiffness for film A was measured by positioning the film A surface of the laminate film facing upwards.

EXAMPLE 11

Kaolin as an inert compound was added in the proportions shown in Table 10 to polyethylene-2,6-naphthalate polymers having an intrinsic viscosity of 0.50 and 0.63, respectively. Laminate films were prepared using these polymers in the same way as in Example 8 except that the films were stretched biaxially, first in the longitudinal direction at a ratio of 3.4 and then in the transverse direction at a ratio of 3.7 to form a film having a thickness of 23 microns. The films were then heat-set for 30 seconds in hot air held at 230° C. The properties of the resulting laminate film were measured, and the results are shown in Table 10 as Run No. 1.

For comparison, the non-laminated polyester films were likewise tested as to the properties indicated in Table 10. The results are shown in Table 10 as Comparative Runs Nos. 1 to 2.

It is clear from Table 10 that when polyethylene-2,6-naphthalate was used as the polyester, the same results as in Example 10 were obtained. When magnetic tapes were produced in accordance with this invention by coating the same magnetic layer used in Example 8 on the laminate film of Run No. 1 in the same manner as in Example 8, they were found to have superior properties, as in Example 10.

Table 10

|  |  | Run No. 1 | Comparative Runs Nos. | |
|---|---|---|---|---|
|  |  |  | 1 | 2 |
| Proportion of the thickness of each film (%) | Film B | 50 | — | — |
|  | Film A | 50 |  |  |
| Amount of kaolin added (wt.%) | Film B | 0 | 0.14 | 0.14 |
|  | Film A | 0.14 |  |  |
| Intrinsic viscosity of each film (100 cc/g) | Film B | 0.60 | 0.48 | 0.61 |
|  | Film A | 0.48 |  |  |
| Thickness (μ) |  | 23 | 23 | 23 |

Table 10-continued

|  |  | Run No. 1 | Comparative Runs Nos. | |
|---|---|---|---|---|
|  |  |  | 1 | 2 |
| Stiffness of each film* | Film B | 34.0 | 29.0 | 29.5 |
|  | Film A | 32.5 |  |  |
| Density of each film (g/cm³) | Film B | 1.3597 | 1.3613 | 1.3596 |
|  | Film A | 1.3613 |  |  |
| Wear loss of each film (mg) | Film B | 57.9 | 49.3 | 57.1 |
|  | Film A | 48.5 |  |  |

*The stiffness was measured as indicated in the footnote to Table 9.

EXAMPLE 12

Polyester laminate films having a longitudinal F-5 value of at least 12.0 Kg/mm² were prepared in the same way as in Example 8, using the same polyethylene terephthalate for forming the polyester film A and the same polyethylene terephthalate for forming the polyester film B as used in Example 8, except that the stretch ratios in the longitudinal and transverse directions and the heat-setting temperature were varied as shown in Table 11. The various properties of the resulting laminate films were measured, and the results are shown in Table 11.

For comparison, the results of a tensile test on Comparative Run No. 2 of Example 8 (in Table 11, this is designated as Comparative Run No. A) and Comparative Run No. 4 of Example 8 (in Table 11, this is designated as Comparative Run No. B).

It is seen from Table 11 that the laminate films having a longitudinal F-5 value of at least 12.0 Kg/mm² have very superior strength characteristics.

The same magnetic layer used in Example 8 was coated onto the laminate films in Runs Nos. 1 and 2 of this Example in the same manner as in Example 8 to produce magnetic tapes of this invention. The number of drop-outs measured on the resulting magnetic tapes was 2 to 3. These magnetic tapes had good running properties, and superior mechanical strength, so that it was possible to render the thickness of the base laminate film extremely small.

The polyester film B of Run No. 4 shown in Table 11 contained 5% by weight of polyethylene-2,6-naphthalate.

Table 11

| Runs Nos. | Proportion of the thickness of each film (%) | | Amount of kaolin added (wt.%) | | Stretch ratio (longitudinal × transverse) | Heat-setting temperature (°C.) | Base film | | | | | | |
|---|---|---|---|---|---|---|---|---|---|---|---|---|---|
|  |  |  |  |  |  |  | Thickness (μ) | Wind-up condition | Coefficient of static friction (μs) | | Tensile Test Results | | |
|  |  |  |  |  |  |  |  |  |  |  | Break elongation (%)* | Break tensile strength (Kg/mm²) | F-5 value (Kg/mm²) |
|  | Film B | Film A | Film B | Film A |  |  |  |  | Film A | Film B |  |  |  |
| 1 | 70 | 30 | 0 | 0.14 | 4.0 × 3.7 | 205 | 12 | Good | 0.55 | >4.0 | MD 110 | 35 | 12.5 |
|  |  |  |  |  |  |  |  |  |  |  | TD 130 | 29 | 10.2 |
|  |  |  |  |  |  |  |  |  |  |  | MD 80 | 42 | 15.3 |

Table 11-continued

| Runs Nos. | Proportion of the thickness of each film (%) Film B | Proportion of the thickness of each film (%) Film A | Amount of kaolin added (wt.%) Film B | Amount of kaolin added (wt.%) Film A | Stretch ratio (longitudinal × transverse) | Heat-setting temperature (°C.) | Base film Thickness (μ) | Base film Wind-up condition | Coefficient of static friction (μs) Film A | Coefficient of static friction (μs) Film B | Break elongation (%)* | Break tensile strength (Kg/mm²) | F-5 value (Kg/mm²) |
|---|---|---|---|---|---|---|---|---|---|---|---|---|---|
| 2 | 70 | 30 | 0 | 0.28 | 4.4 × 3.3 | 195 | 12 | Good | 0.50 | >4.0 | | | |
| | | | | | | | | | | | TD 150 | 31 | 10.2 |
| | | | | | | | | | | | MD 82 | 41 | 15.4 |
| 3 | 70 | 30 | 0.01 | 0.14 | 4.4 × 3.3 | 195 | 12 | Good | 0.56 | 0.95 | | | |
| | | | | | | | | | | | TD 150 | 30 | 10.3 |
| | | | | | | | | | | | MD 81 | 42 | 15.8 |
| 4 | 50 | 50 | 0.01 | 0.14 | 4.4 × 3.3 | 205 | 12 | Good | 0.51 | 0.90 | | | |
| | | | | | | | | | | | TD 148 | 33 | 10.6 |
| Comparative Run A | — | 100 | — | 0.14 | 3.6 × 4.1 | 205 | 23 | Good | 0.47 | — | MD 102 | 24 | 11.8 |
| | | | | | | | | | | | TD 95 | 26 | 12.6 |
| B | 100 | — | 0.01 | — | 3.6 × 4.1 | 205 | 23 | Slightly poor | — | 0.90 | MD 110 | 22 | 11.2 |
| | | | | | | | | | | | TD 85 | 29 | 11.0 |

*MD = machine direction,
TD = transverse direction

EXAMPLE 13

Polyester laminate films having a longitudinal F-5 value of at least 16.0 Kg/mm² were prepared in the same way as in Example 9 using the same polyethylene-2,6-naphthalate polymers for forming the polyester films A and B as used in Example 9, except that the stretch ratios in the longitudinal and transverse directions were varied as shown in Table 12. The various properties of the laminate films obtained were measured. The results are shown in Table 12 as Runs Nos. 1 and 2.

For comparison, the various properties of the non-laminated polyethylene-2,6-naphthalate films were measured, and the results are shown in Table 12 as Comparative Run Nos. 1 and 2.

When magnetic tapes were prepared by coating the same magnetic layer used in Example 8 onto the laminate films of Runs Nos. 1 and 2 of this Example in the same manner as in the Example 8, they were found to have superior properties as in Example 12.

EXAMPLE 14

Ethylene terephthalate was polymerized in the same way as in Example 8 except that CARBON BLACK ASAHI X-1 (registered trademark for the product of Asahi Carbon Company) was used in the proportions shown in Table 13 instead of using the fine powder of kaolin as an inert compound to form polymers for forming polyester film A and polyester film B. Base laminate films were prepared from these polymers in the same way as in Example 8 except that the stretch ratios and the heat-setting temperatures shown in Table 13 were employed. The results are shown in Table 13 as Runs Nos. 1 and 2.

For comparison, the properties of the non-laminated polyester films were measured, and shown in Table 13 as Comparative Runs Nos. 1 and 2.

It is seen from Table 13 that the polyester film A of the laminate film containing carbon black as the inert compound has an extremely low surface resistivity.

Magnetic tapes were prepared by coating the same magnetic layer used in Example 8 onto the surface of the polyester film B of the laminate film in Runs Nos. 1

Table 12

| Runs Nos. | Proportion of the thickness of each film (%) Film B | Proportion of the thickness of each film (%) Film A | Amount of kaolin added (wt.%) Film B | Amount of kaolin added (wt.%) Film A | Stretch ratios (longitudinal × transverse) | Heat setting temperature (°C.) | Thickness (μ) | Wind-up condition | Coefficient of static friction Film A | Coefficient of static friction Film B | Break elongation (%)* | Tensile break strength (kg/mm²) | F-5 value (Kg/mm²) |
|---|---|---|---|---|---|---|---|---|---|---|---|---|---|
| 1 | 70 | 30 | 0 | 0.14 | 4.4 × 3.3 | 215 | 12 | Good | 0.40 | >4.0 | MD 54 | 39 | 17.5 |
| | | | | | | | | | | | TD 79 | 29 | 14.3 |
| 2 | 50 | 50 | 0.01 | 0.14 | 4.4 × 3.3 | 215 | 12 | Good | 0.39 | 0.95 | MD 56 | 40 | 17.4 |
| | | | | | | | | | | | TD 78 | 29 | 14.2 |
| Comparative Run 1 | — | 100 | — | 0.14 | 3.3 × 3.6 | 215 | 12 | Good | 0.38 | — | MD 80 | 27 | 14.0 |
| | | | | | | | | | | | TD 80 | 26 | 15.1 |
| 2 | 100 | — | 0.01 | — | 3.3 × 3.6 | 215 | 12 | Slightly poor | — | 1.00 | MD 82 | 27 | 14.1 |
| | | | | | | | | | | | TD 83 | 25 | 15.3 |

*MD = machine direction,
TD = transverse direction and 2 in the same manner as in Example 8. Since these magnetic tapes had good electric conductivity, they had a very much reduced tendency to collect dust and dirt. In conjunction with the smooth surface of the polyester film B, the magnetic tapes obtained had a greatly reduced occurrence of drop-outs, and exhibited superior running property.

Table 13

| Runs Nos. | Proportion of thickness of each film (%) Film B | Proportion of thickness of each film (%) Film A | Amount of carbon black added (wt.%) Film B | Amount of carbon black added (wt.%) Film A | Stretch ratio (longitudinal × transverse) | Heat setting temperature (°C.) | Thickness (μ) | Surface resistivity (ohms) | | Break elongation (%)* | Break strength (Kg/mm²) | F-5 value (Kg/mm²) | Coefficient of static friction Film A | Coefficient of static friction Film B |
|---|---|---|---|---|---|---|---|---|---|---|---|---|---|---|
| 1 | 90 | 10 | 0 | 15 | 3.4 × 3.8 | 210 | 28 | 7 × 10¹¹ | MD | 123 | 23.5 | 11.2 | | |
| | | | | | | | | | TD | 110 | 27.8 | 11.1 | 0.38 | >4.0 |
| 1 | 90 | 10 | 0 | 20 | 3.4 × 3.8 | 210 | 28 | 5 × 10¹⁰ | MD | 120 | 22.4 | 10.7 | | |
| | | | | | | | | | TD | 118 | 27.3 | 10.8 | 0.33 | >4.0 |
| Comparative Run 1 | — | 100 | — | 5 | 2.9 × 3.2 | 210 | 28 | 8 × 10¹⁴ | MD | 115 | 17.3 | 8.7 | | |
| | | | | | | | | | TD | 103 | 18.5 | 9.1 | 0.36 | — |
| 2 | 100 | — | 0 | — | 3.4 × 3.8 | 210 | 28 | 4 × 10¹⁶ | MD | 140 | 27.2 | 11.7 | | |
| | | | | | | | | | TD | 110 | 30.1 | 11.4 | — | >4.0 |

*MD = machine direction,
TD = transverse direction

What we claim is:

1. A magnetic tape comprising a biaxially-stretched and heat-set polyester laminate having:
    (A) an extruded first polyester film forming a first layer of the laminate, having an intrinsic viscosity of 0.35 to 1.0, and containing a finely-divided inert compound so that the coefficient of static friction is not greater than 0.80;
    (B) a co-extruded second polyester film containing no finely-divided inert compound and forming a second layer of the laminate, having an intrinsic viscosity greater than that of film (A) by 0.02 to 0.5, and having a coefficient of static friction greater than that of film (A) by at least 0.05; and
    (C) a magnetic layer coated on the external surface of layer (B), the magnetic tape being curled in the widthwise direction and layer (B) being the inside layer of the curl.

2. The magnetic tape of claim 1 wherein the inert compound is at least one member selected from the group consisting of MgO, ZnO, MgCO₃, CaCO₃, CaSO₄, BaSO₄, Al₂O₃, SiO₂, TiO₂, calcium terephthalate, barium terephthalate, zinc terephthalate, manganese terephthalate, and carbon black.

3. The magnetic tape of claim 1 wherein the amount of the inert compound added is from 0.01 to 40% by weight based on the weight of layer (A).

4. The magnetic tape of claim 3 wherein the amount of the inert compound added is from 0.05 to 5% by weight, based on the weight of layer (A).

5. The magnetic tape of claim 4 wherein the amount of the inert compound added is from 0.1 to 2% by weight, based on the weight of layer (A).

6. The magnetic tape of claim 1 wherein the particle diameter of the inert compound, expressed as the arithmetic mean of the maximum and minimum values of the diameter, is from about 0.1 to 10 microns.

7. The magnetic tape of claim 1 wherein the coefficient of static friction of layer (B) is greater than that of layer (A) by at least 0.2.

8. The magnetic tape of claim 7 wherein the coefficient of static friction of layer (B) is greater than that of layer (A) by at least 0.5.

9. The magnetic tape of claim 1 wherein the thickness of the laminate is from 1 to 200 microns.

10. The magnetic tape of claim 9 wherein the thickness of the laminate is from 6 to 50 microns.

11. The magnetic tape of claim 1 wherein the proportion of the thickness of layer A is from 5 to 50% by weight, of the thickness of the base laminate film.

12. The magnetic tape of claim 1 wherein at least one of layers (A) and (B) is a layer of a polymer blend consisting of polyethylene terephthalate and polyethylene-2,6-naphthalate.

13. The magnetic tape of claim 35 wherein the proportion of the polyethylene-2,6-naphthalate in the polymer blend is from 0.1 to 49.0% by weight.

14. The magnetic tape of claim 1 wherein the inert compound is carbon black.

15. The magnetic tape of claim 1 wherein layer (A) has a surface resistivity of less than 10¹² ohms.

16. The magnetic tape of claim 14 wherein the amount of the carbon black is from 10 to 40% by weight.

17. The magnetic tape of claim 16 wherein the amount of the carbon black is from 15 to 25% by weight.

18. The magnetic tape of claim 9 wherein the intrinsic viscosity for the polyester constituting the layers ranges from 0.4 to 0.9.

19. The magnetic tape of claim 18 wherein the difference in intrinsic viscosity between that of film (A) and film (B) is from 0.03 to 0.2.

20. The magnetic tape of claim 19 wherein the difference in intrinsic viscosity between that of film (A) and film (B) is from 0.04 to 0.1.

21. The magnetic tape of claim 1 wherein the laminate film has a longitudinal F-5 value of at least 12.0 kg/mm².

22. The magnetic tape of claim 1 wherein the magnetic layer consists essentially of a circular γ-type ferric oxide and a binder.

23. The film of claim 1 wherein the laminate is stretched longitudinally at a ratio of 3.5 to 6.0 and transversely at a ratio of 1.5 to 4.0, with the longitudinal stretch ratio being greater than the transverse by at least 0.3.

24. The film of claim 23 wherein the laminate is stretched longitudinally at a ratio of 4.0 to 5.0 and transversely at a ratio of 2.5 to 3.5, the longitudinal ratio being greater than the transverse by at least 0.7.

25. The film of claim 24 wherein the longitudinal stretch ratio is greater than the transverse stretch ratio by at least 1.0.

26. The film of claim 1 wherein the laminate is stretched longitudinally at a ratio of 3.5 to 6.0 and transversely at a ratio of 1.5 to 4.0, with the longitudinal stretch ratio being greater than the transverse by at least 0.3.

27. The film of claim 26 wherein the laminate is stretched longitudinally at a ratio of 4.0 to 5.0 and transversely at a ratio of 2.5 to 3.5, the longitudinal ratio being greater than the transverse by at least 0.7.

28. The film of claim 27 wherein the longitudinal stretch ratio is greater than the transverse stretch ratio by at least 1.0.

29. The magnetic tape of claim 1 having additionally (D) a third polyester film interposed between films (A) and (B).

30. The magnetic tape of claim 29 wherein the polyester constituting the layers (A), (B), and (D) is a homopolyester selected from the group consisting of polyethylene terephthalate, polyethylene-2,6-naphthalate, polytetramethylene terephthalate, and polytetramethylene-2,6-naphthalate.

31. The film of claim 29 wherein pigments are incorporated in layer (C).

* * * * *